United States Patent
Su et al.

(10) Patent No.: US 6,900,739 B2
(45) Date of Patent: May 31, 2005

(54) DEVICE AND METHOD FOR ADJUSTING VIEW RANGE OF VEHICULAR MONITORING DEVICE

(75) Inventors: Wen-Wei Su, Taoyuan (TW); Kuei-Hung Chen, Taoyuan (TW); Shun-Hsiang Hsiao, Taoyuan (TW)

(73) Assignee: Exon Science, Inc., Taoyuan (TW)

( * ) Notice: Subject to any disclaimer, the term of this patent is extended or adjusted under 35 U.S.C. 154(b) by 0 days.

(21) Appl. No.: 10/374,160

(22) Filed: Feb. 25, 2003

(65) Prior Publication Data

US 2003/0160685 A1 Aug. 28, 2003

(30) Foreign Application Priority Data

Feb. 25, 2002 (CN) ........................................ 02105275 A

(51) Int. Cl.⁷ ................................................. G08G 1/00
(52) U.S. Cl. ...................... 340/904; 340/467; 340/903; 340/470; 359/843; 359/849
(58) Field of Search .................. 340/438, 435, 340/466, 467, 436, 903, 463, 464, 470, 475, 478, 425.5, 904; 359/843, 849, 838, 844; 701/48

(56) References Cited

U.S. PATENT DOCUMENTS

| | | | | |
|---|---|---|---|---|
| 5,027,200 A | * | 6/1991 | Petrossian et al. | 348/118 |
| 5,126,885 A | * | 6/1992 | Gray | 359/841 |
| 5,463,384 A | * | 10/1995 | Juds | 340/903 |
| 6,116,742 A | * | 9/2000 | Ahn | 359/843 |
| 6,193,380 B1 | * | 2/2001 | Jacobs | 359/843 |
| 6,389,340 B1 | * | 5/2002 | Rayner | 701/35 |
| 6,390,631 B1 | * | 5/2002 | Lang et al. | 359/843 |
| 6,485,155 B1 | * | 11/2002 | Duroux et al. | 359/877 |

* cited by examiner

Primary Examiner—Jeffery Hofsass
Assistant Examiner—Eric Blount
(74) Attorney, Agent, or Firm—Volpe and Koenig, P.C.

(57) ABSTRACT

A device for adjusting a view range of a vehicular monitoring device includes an overtaking pre-motion detector outputting an adjusting signal when an overtaking operation is predicted; and a controller in communication with the overtaking pre-motion detector and the vehicular monitoring device, controlling the vehicular monitoring device to move in response to the adjusting signal. The device may further output a warning signal to sound the horn or twinkle the vehicle lamp when the overtaking operation is predicted for safety consideration.

43 Claims, 2 Drawing Sheets

DEVICE AND METHOD FOR ADJUSTING VIEW RANGE OF VEHICULAR MONITORING DEVICE

FIELD OF THE INVENTION

The present invention relates to a view-range adjusting device, and more particular to a device for adjusting the view range of a vehicular monitoring device in response to a pre-motion operation. The present invention also relates to a method for adjusting a vehicular monitoring device.

BACKGROUND OF THE INVENTION

When a driver is seated in a vehicle, he should adjust all of the interior and exterior rearview mirrors according to his need. The rearview mirror can be adjusted manually or automatically by pushing buttons. After the adjustment of rearview mirrors is done, the view angle of each rearview mirror seen by the driver is constant, and it is difficult and also dangerous for the driver to further change the view angles while driving.

In practice, when a driver would like to change to another lane, turn to another direction or overtaking a car, he will need to realize more about the situation of the adjacent lane to see whether there is any vehicle oncoming. Therefore, the horizontally turning of the rearview mirror toward the target lane will be helpful for the lane-changing or overtaking operation. In addition, while moving up or down a slope, it is advantageous to turn the rearview mirror vertically to obtain a view range similar to that on the flat road.

Aside from the above situations, there are more situations needing a proper view range different from that required in the normal driving mode.

SUMMARY OF THE INVENTION

Therefore, an object of the present invention is to provide a device and a method for adjusting the view range of the rearview mirror in various cases so as to provide a suitable view range for the driver.

A first aspect of the present invention relates to a device for adjusting a view range of a vehicular monitoring device. The device comprises an overtaking pre-motion detector outputting an adjusting signal when an overtaking operation is predicted; and a controller in communication with the overtaking pre-motion detector and the vehicular monitoring device, controlling the vehicular monitoring device to move in response to the adjusting signal.

Preferably, the overtaking pre-motion detector further outputs a warning signal to a video and/or audio warning device when the overtaking operation is predicted.

For example, the warning device is a horn which sounds in a desired pattern in response to the warning signal. For another example, the warning device is a vehicular lamp which twinkles in a desired pattern in response to the warning signal.

In an embodiment, the overtaking pre-motion detector outputs the adjusting signal when the over-drive (OD) gear is shut off.

In an embodiment, the overtaking pre-motion detector outputs the adjusting signal when the revolving speed of the engine exceeds a threshold value.

In an embodiment, the overtaking pre-motion detector outputs the adjusting signal when the acceleration of the vehicle exceeds a threshold value.

In an embodiment, the overtaking pre-motion detector outputs the adjusting signal when a specific light signal is outputted by the vehicular lamp or lamps.

The vehicular monitoring device, for example, can be a rearview mirror, a camera such as CCD or CMOS camera and/or a display such as a liquid crystal display.

Preferably, a movement speed of the vehicular monitoring device between an initial position and a working position depends on a velocity of the vehicle.

Preferably, the device further comprises a vehicular digital bus such as a controller area network (CAN) bus or a vehicle area network (VAN) bus for communicating the overtaking pre-motion detector with the controller.

Preferably, the controller asserts a recovering signal to the vehicular monitoring device to force the vehicular monitoring device to return to an initial position suitable for the normal driving mode when an emergency state is determined.

The emergency state, for example, can be determined when emergency brake is done, when the anti-lock brake system (ABS) is enabled, or when the traction control system is enabled.

In an embodiment, the controller asserts a recovering signal to have the vehicular monitoring device return to an initial position suitable for the normal driving mode when the OD gear is entered again, the revolving speed of the engine changes to a level below the threshold value, the acceleration of the vehicle is lowered, or the specific light signal is stopped for a predetermined period of time.

Alternatively, the controller asserts a recovering signal to have the vehicular monitoring device move toward an initial position suitable for the normal driving mode in a predetermined period of time after the vehicular monitoring device reaches a working position suitable for overtaking motion.

A second aspects of the present invention relates to a device for adjusting a view range of a vehicular monitoring device, comprising a getting-off pre-motion detector outputting an adjusting signal when a getting-off operation is predicted; and a controller in communication with the getting-off pre-motion detector and the vehicular monitoring device, controlling the vehicular monitoring device to move in response to the adjusting signal.

In an embodiment, the getting-off pre-motion detector outputs the adjusting signal in response to the enabling of the emergency flasher switch.

In an embodiment, the getting-off pre-motion detector outputs the adjusting signal in response to substantially zero velocity of the vehicle.

In an embodiment, the getting-off pre-motion detector outputs the adjusting signal in response to the turning-off of the engine.

In an embodiment, the getting-off pre-motion detector outputs the adjusting signal in response to the entering of the parking gear.

In an embodiment, the controller asserts a recovering signal to have the vehicular monitoring device return to an initial position suitable for the normal driving mode when the emergency flasher switch is disabled, the vehicle has a non-zero velocity, the engine is started, or the parking gear is disengaged. Alternatively, the controller asserts a recovering signal to have the vehicular monitoring device move toward an initial position suitable for the normal driving mode in a predetermined period of time after the vehicular monitoring device reaches a working position suitable for overtaking motion.

A third aspects of the present invention relates to a method for adjusting a view range of a vehicular monitoring device. The method comprises steps of detecting a status of a vehicle; determining whether a pre-motion operation is performed according to the status of the vehicle; outputting an adjusting signal to move the vehicular monitoring device between an initial position and a working position when the pre-motion operation is performed; and outputting a warning signal to enable a warning device when the pre-motion operation is performed.

In an embodiment, the pre-motion operation is an overtaking pre-motion operation. For example, the pre-motion operation is to shut off the over-drive (OD) gear, to significantly step on the accelerator, to sudden change up the vehicle, or to output a specific light signal.

In an embodiment, the pre-motion operation is a getting-off pre-motion operation. For example, the pre-motion operation is to enable the emergency flasher switch, to zero the velocity of the vehicle, to turn off of the engine, or to enter the parking gear.

The vehicular monitoring device can be moved by a single trip or a to-and-fro scanning mode between an initial position and a working position when the pre-motion operation is performed.

Depending on practice, the vehicular monitoring device can be moved in one or two dimensions.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
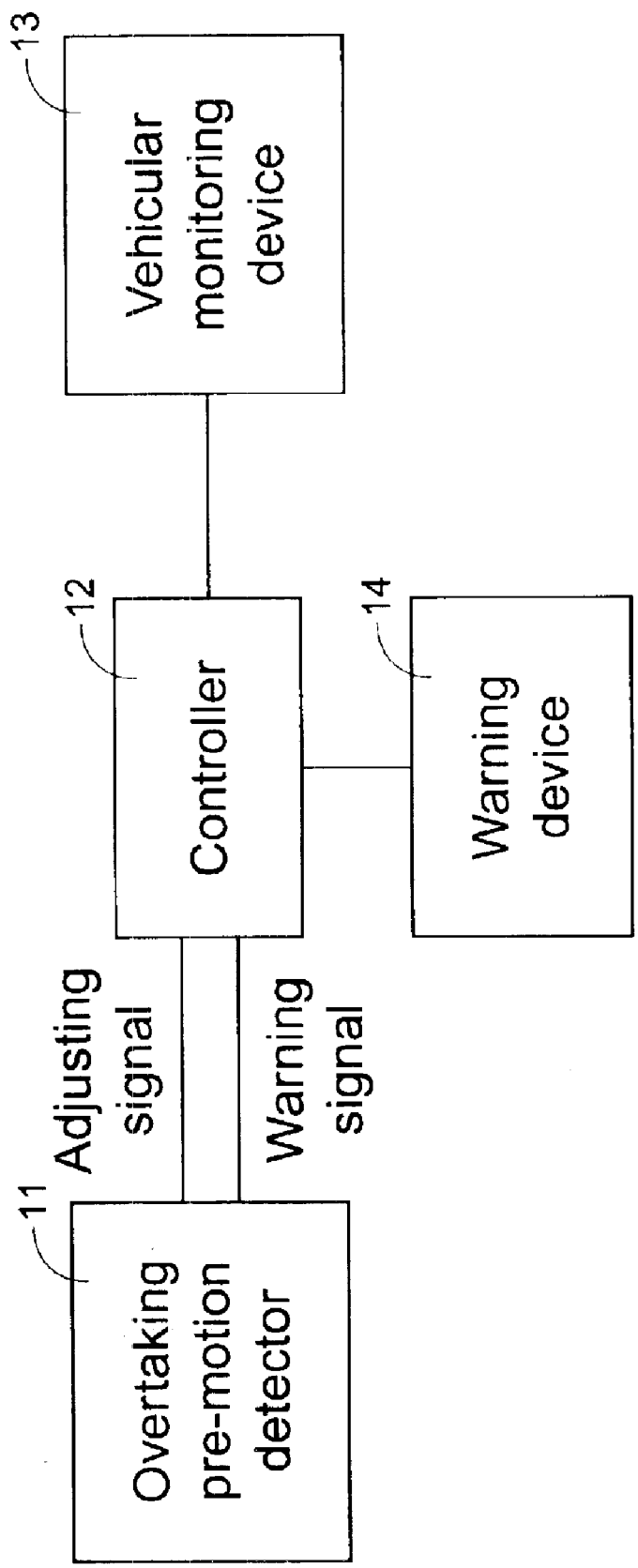
FIG. 1 is a schematic block diagram showing a device for adjusting the view range of a vehicular monitoring device according to a first embodiment of the present invention.

Please refer to FIG. 1 which schematically shows a device for adjusting the view range of a vehicular monitoring device according to a first embodiment of the present invention. The device includes a overtaking pre-motion detector 11 and a controller 12 in communication with the overtaking pre-motion detector 11 and the vehicular monitoring device 13 such as a rearview mirror, a camera and/or a display. The camera, for example, can be a CCD or CMOS camera. The display, for example, can be a liquid crystal display. When the overtaking pre-motion detector 11 detects the over-drive (OD) gear is shut off, the revolving speed of the engine exceeds a threshold value, which for example can be achieved by significantly stepping on the accelerator, the vehicle suddenly changes up, or a specific light signal known to the public is outputted, e.g. the twinkling of the headlamp, it is predicted that an overtaking operation is ready to launch. Meanwhile, the overtaking pre-motion detector 11 outputs an adjusting signal to the controller 12. The controller 12 then controls the movement of the rearview mirror 13 between an initial position and a working position in response to the adjusting signal.

Herein and hereinafter, the term "move", "moving", "moved" or "movement" broadly means the change of the vehicular monitoring device on location, orientation, focus, zooming effect etc., due to for example shift, rotation, pivoting or the combination thereof, in order to obtain a suitable view range. The movement between the initial position and the working position may indicate the single trip from the initial position to the working position suitable for the overtaking motion or the signal trip from the working position to the initial position suitable for normal driving mode. Alternatively, the movement between the initial position and the working position may be a to-and-fro scanning motion or a two-dimensional motion, depending on practice.

During the movement of the vehicular monitoring device from the initial position to working position, the vehicular monitoring device is preferably forced to return to the initial position if an emergency state occurs. For example, the emergency state is determined when emergency brake is done, when the Anti-lock brake system (ABS) or the traction control system is enabled, etc.

After the movement of the vehicular monitoring device form the initial position to the working position in response to the above-described pre-motion operation has been done, the vehicular monitoring device should return to the initial position. For example, when the pre-motion detector 11 detects that the OD gear is entered again, the revolving speed of the engine changes below the threshold value, the acceleration of the vehicle is lowered, or the specific light signal is stopped for a predetermined period of time, a recovering signal is outputted from the pre-motion detector 11 to the controller 12 to have the vehicular monitoring device return to the initial position.

Figure 2:
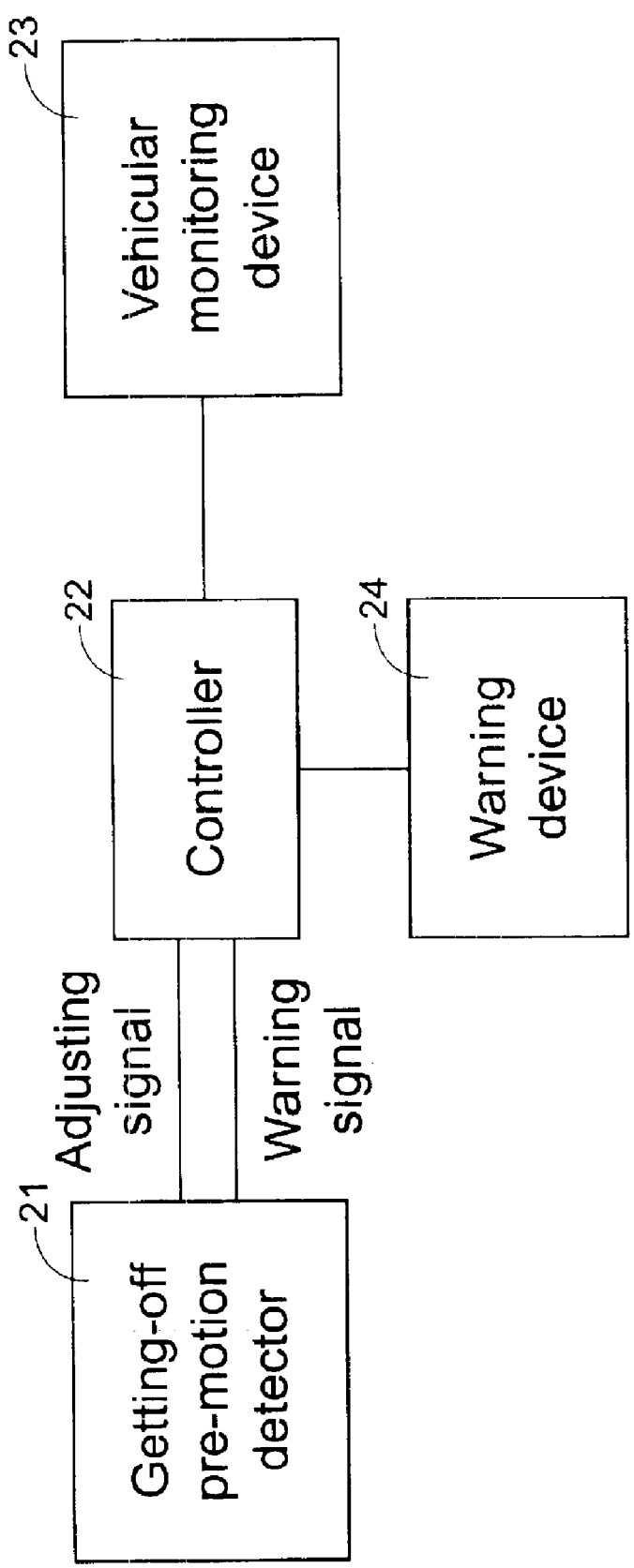
FIG. 2 is a schematic block diagram showing a device for adjusting the view range of a vehicular monitoring device according to a second embodiment of the present invention.

Please refer to FIG. 2 which schematically shows a device for adjusting the view range of a vehicular monitoring device according to a second embodiment of the present invention. The device includes a getting-off pre-motion detector 21 and a controller 22 in communication with the getting-off pre-motion detector 21 and the vehicular monitoring device 23 such as a rearview mirror, a camera and/or a display. When the getting-off pre-motion detector 21 detects, for example, the enabling of the emergency flasher switch, zero velocity of the vehicle, the turning-off of the engine, or the entering of the parking gear, it frequently implies that there would be people getting off the vehicle. Therefore, the getting-off pre-motion detector 21 outputs an adjusting signal to the controller 22. The controller 22 then controls the movement of the rearview mirror 23 between an initial position and a working position in response to the adjusting signal. The definition of movement is similar to that described in the first embodiment.

After the movement of the vehicular monitoring device form the initial position to the working position in response to the above-described pre-motion operation has been done, the vehicular monitoring device should return to the initial position. For example, when the emergency flasher switch is disabled, the vehicle has a non-zero velocity, the engine is started, or the parking gear is disengaged. Meanwhile, a recovering signal is outputted from the pre-motion detector 21 to the controller 22 to have the vehicular monitoring device return to the initial position.

For the above embodiments, the recovery of the vehicular monitoring device can also be determined by timing. For example, the vehicular monitoring device is moved toward the initial position in a few seconds after the vehicular monitoring device reaches the working position.

For the above embodiments, the pre-motion detector 11 or 21 can also output a warning signal to the controller 11 or 21 in addition to the adjusting signal. The controller 11 or 21 enables a warning device 14 or 24 in response to the warning signal for safety purpose. For example, the horn sounds or the vehicular lamp twinkles in a desired pattern.

For the above embodiments, the functions of the pre-motion detector 11 or 21 and the controller 12 or 22 can be performed by a micro-controller in a way of programs.

It is to be noted that the automatic view-angle adjusting function can be designed as a basic response of the vehicle. Alternatively, the function can be enabled by pressing a key or a button.

In another aspect of the present invention, preferably, the movement speed of the vehicular monitoring device between the initial position and any of the working positions depends on the velocity of the vehicle. The faster the vehicle runs, the faster the vehicular monitoring device moves. As such, the driver can realize the environment situation quickly. For efficiently achieving the above purpose, a vehicular digital bus such as a controller area network (CAN) or a vehicular area network (VAN) bus is preferred used to transfer signals.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A device for adjusting a view range of a vehicular monitoring device of a vehicle, comprising:
   an overtaking pre-motion detector outputting an adjusting signal when an overtaking operation is predicted by detecting a change in powertrain output of said vehicle; and
   a controller in communication with said overtaking pre-motion detector and said vehicular monitoring device, controlling said vehicular monitoring device to move in response to said adjusting signal.

2. The device according to claim 1 wherein said overtaking pre-motion detector further outputs a warning signal to a video and/or audio warning device when said overtaking operation is predicted.

3. The device according to claim 2 wherein said warning device is a horn which sounds in a desired pattern in response to said warning signal.

4. The device according to claim 2 wherein said warning device is a vehicular lamp which twinkles in a desired pattern in response to said warning signal.

5. The device according to claim 1 wherein said overtaking pre-motion detector outputs said adjusting signal when the over-drive (OD) gear is shut off.

6. The device according to claim 1 wherein said overtaking pre-motion detector outputs said adjusting signal when the revolving speed of the engine exceeds a threshold value.

7. The device according to claim 1 wherein said overtaking pre-motion detector outputs said adjusting signal when the acceleration of the vehicle exceeds a threshold value.

8. The device according to claim 1 wherein said vehicular monitoring device is a rearview mirror.

9. The device according to claim 1 wherein said vehicular monitoring device is a camera.

10. The device according to claim 1 wherein said vehicular monitoring device is a display.

11. The device according to claim 1 wherein a movement speed of said vehicular monitoring device between an initial position and a working position depends on a velocity of the vehicle.

12. The device according to claim 1 further comprising a vehicular digital bus for communicating said overtaking pre-motion detector with said controller.

13. The device according to claim 12 wherein said vehicular digital bus is a controller area network (CAN) bus or a vehicle area network (VAN) bus.

14. The device according to claim 1 wherein said controller asserts a recovering signal to said vehicular monitoring device to force said vehicular monitoring device to return to an initial position suitable for the normal driving mode when an emergency state is determined.

15. The device according to claim 14 wherein said emergency state is determined when emergency brake is done.

16. The device according to claim 14 wherein said emergency state is determined when the anti-lock brake system (ABS) is enabled.

17. The device according to claim 14 wherein said emergency state is determined when the traction control system is enabled.

18. The device according to claim 1 wherein said controller asserts a recovering signal to have said vehicular monitoring device return to an initial position suitable for the normal driving mode when the OD gear is entered again, the revolving speed of the engine changes to a level below the threshold value, the acceleration of the vehicle is lowered, or the specific light signal is stopped for a predetermined period of time.

19. The device according to claim 1 wherein said controller asserts a recovering signal to have said vehicular monitoring device move toward an initial position suitable for the normal driving mode in a predetermined period of time after the vehicular monitoring device reaches a working position suitable for overtaking motion.

20. A device for adjusting a view range of a vehicular monitoring device of a vehicle, comprising:
    a pre-motion detector outputting an adjusting signal when a pre-motion that the driver is ready to get off said vehicle is predicted; and
    a controller in communication with said pre-motion detector and said vehicular monitoring device, controlling a view range of said vehicular monitoring device to be changed for monitoring various regions in response to said adjusting signal whether a vehicle ignition is on or off.

21. The device according to claim 20 wherein said pre-motion detector further outputs a warning signal to a video and/or audio warning device when said pre-motion is predicted.

22. The device according to claim 21 wherein said warning device is a horn which sounds in a desired pattern in response to said warning signal.

23. The device according to claim 21 wherein said warning device is a vehicular lamp which twinkles in a desired pattern in response to said warning signal.

24. The device according to claim 20 wherein said pre-motion detector outputs said adjusting signal in response to the enabling of the emergency flasher switch.

25. The device according to claim 20 wherein said pre-motion detector outputs said adjusting signal in response to substantially zero velocity of the vehicle.

26. The device according to claim 20 wherein said pre-motion detector outputs said adjusting signal in response to the turning-off of the engine.

27. The device according to claim 20 wherein said pre-motion detector outputs said adjusting signal in response to the entering of the parking gear.

28. The device according to claim 20 wherein said vehicular monitoring device is a rearview mirror, a camera and/or a display.

29. The device according to claim 20 wherein a movement speed of said vehicular monitoring device between an initial position and a working position depends on a velocity of the vehicle.

30. The device according to claim 20 further comprising a vehicular digital bus for communicating said pre-motion detector with said controller.

31. The device according to claim 30 wherein said vehicular digital bus is a controller area network (CAN) bus or a vehicle area network (VAN) bus.

32. The device according to claim 20 wherein said controller asserts a recovering signal to said vehicular monitoring device to force said vehicular monitoring device to return to an initial position suitable for the normal driving mode when an emergency state is determined.

33. The device according to claim 32 wherein said emergency state is determined when emergency brake is done, or the anti-lock brake system (ABS) or the traction control system is enabled.

34. The device according to claim 20 wherein said controller asserts a recovering signal to have said vehicular monitoring device return to an initial position suitable for the normal driving mode when the emergency flasher switch is disabled, the vehicle has a non-zero velocity, the engine is started, or the parking gear is disengaged.

35. The device according to claim 20 wherein said controller asserts a recovering signal to have said vehicular monitoring device move toward an initial position suitable for the normal driving mode in a predetermined period of time after the vehicular monitoring device reaches a working position suitable for overtaking motion.

36. A method for adjusting a view range of a vehicular monitoring device of a vehicle, comprising:

detecting a status of said vehicle;

determining whether a pre-motion operation that the driver is ready to get off said vehicle is performed according to said status of said vehicle;

outputting an adjusting signal to move said vehicular monitoring device between a first view range for monitoring a first region and a second view range for monitoring a second region when said pre-motion operation is performed; and outputting a warning signal to enable a warning device when said pre-motion operation is performed.

37. The method according to claim 36 wherein said pre-motion operation is to enable the emergency flasher switch, to zero the velocity of the vehicle, to turn off of the engine, or to enter the parking gear.

38. The method according to claim 36 wherein said vehicular monitoring device is moved by a single trip from an initial position to a working position when said pre-motion operation is performed.

39. The method according to claim 36 wherein said vehicular monitoring device is moved by a to-and-fro scanning mode between an initial position and a working position when said pre-motion operation is performed.

40. The method according to claim 36 wherein said vehicular monitoring device is moved in two dimensions.

41. The method according to claim 36 wherein said warning device is a vehicular horn which sounds in a desired pattern in response to said warning signal.

42. The device according to claim 36 wherein said warning device is a vehicular lamp which twinkles in a desired pattern in response to said warning signal.

43. A device for adjusting a view range of a vehicular monitoring device of a vehicle, comprising:

an overtaking pre-motion detector outputting an adjusting signal when an overtaking operation is predicted by detecting a specific light signal to be outputted by the vehicular lamp or lamps; and a controller in communication with said overtaking pre-motion detector and said vehicular monitoring device, controlling said vehicular monitoring device to move in response to said adjusting signal.

* * * * *